INVENTORS
MALCOLM BROOKS STROUD
DONALD F. GREENE
BY H. W. Brelsford
ATTORNEY

United States Patent Office 2,999,555
Patented Sept. 12, 1961

2,999,555
MOTORIZED LITTER
Malcolm Brooks Stroud, 296 Hope Ave., Santa Barbara, Calif., and Donald Floyd Greene, 318 E. Gutierrez St., Santa Barbara, Calif., assignors of one-third to Harry W. Brelsford, Santa Barbara, Calif.
Filed Aug. 29, 1957, Ser. No. 680,939
3 Claims. (Cl. 180—19)

Our invention relates to a motorized litter and has particular reference to a litter mounted on motor driven wheels and adapted to carry heavy loads over rough terrain.

Our invention is designed to carry injured persons in a generally horizontal position over terrain that is precipitous and rough. At least one human operator is required and to traverse country cut by small washes and crevasses, two operators are desirable to lift the wheel portions over abysses greater in width than the wheel base of the litter. While the litter is designed primarily for carrying persons and bodies, such as deer, from broken country, it has proved very effective as a general carrier and as such is the equivalent of a pack animal in the carrying of dunnage, food and equipment.

It is a general object of our invention to provide a motorized litter capable of traversing rough terrain.

Another object is to provide a motorized litter supported on a plurality of wheels which are free to pivot as a unit relative to the litter frame.

Another object is to provide a motorized litter having a motor braking action during downhill travel.

A further object is to provide a multi wheel motorized litter capable of crawling over large rocks and obstructions.

Other objects and advantages will be apparent in the following description and claims considered together with the accompanying drawings in which:

Figure 1:
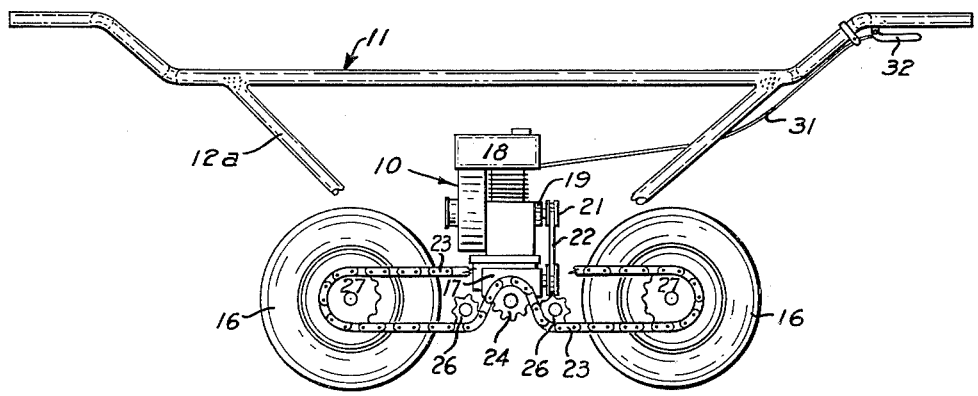
FIG. 1 is an elevation view with portions broken away to disclose the details of the motor unit.
Figure 2:
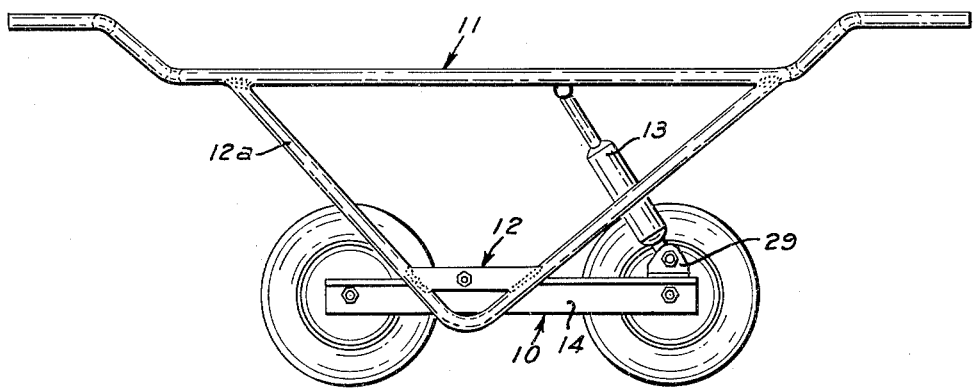
FIG. 2 is an elevation view similar to FIG. 1 with the motor and driving chain removed but showing the complete pivot connection.
Figure 3:
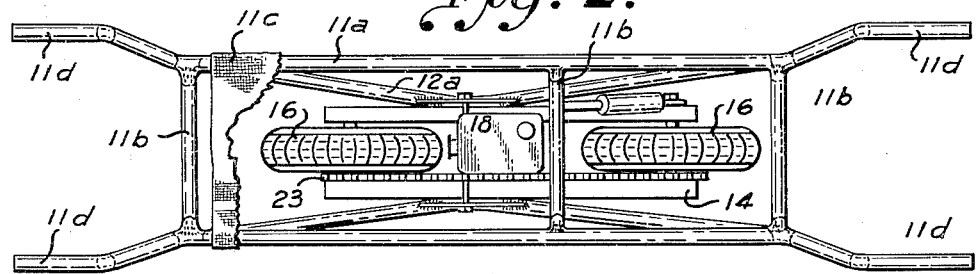
FIG. 3 is a top view of the device of FIGS. 1 and 2 but with portions of the canvas litter bed removed to disclose the motor unit.

Referring to FIGS. 1 through 3, the motorized litter includes three main portions, a wheeled motor unit 10, a litter frame 11, and a U-shaped pivotal connection 12, joining the litter frame 11, to the motor unit 10. A shock absorber 13, may be interposed between the litter frame 11 and the motor unit to control the rate of pivotal movement so that the operator can lift one wheel or the other by lifting or pushing down on one end of the litter frame. Shock absorber 13 may be of any conventional type, including, among others, hydraulic shock absorbers of the dash-pot type.

We have discovered that the wheeled propulsion unit should be constructed of wheels mounted in line with each other. One wheel not only assists the other in climbing rocks and other obstacles, but the wheel base between wheel axles averages out the roughness of the terrain. This results in fewer severe jolts to the litter frame. The in-line arrangement also permits a low mounting of the motor driving unit giving a low center of gravity as well as permitting a lower bed height for the litter. This results in a low over-all center of gravity for the loaded motorized litter.

The motor unit 10 accordingly may have a frame 14 shown in the form of spaced angle members and a pair of wheels 16 mounted for rotation at each end. Disposed between the wheels on the frame may be a gear box 17 upon which may be mounted a motor 18, shown as an air cooled internal combustion engine. This engine may be provided with a centrifugal clutch 19 which drives a pulley 21, connected by a belt 22 to the gear box.

The gear box 17 is provided particularly in accordance with invention in that it is of the non-reversing type. The particular gear box presently preferred is the type known as a cross shaft employing worm gear reduction of about 21 to 1 so that the coefficient of friction prevents reverse turning of the gearing. On down hill travel, the gear box 17, accordingly acts like a brake, and the vehicle progresses down hill only when the motor is driving the gear box. This avoids the necessity of a brake, although suitable brakes, and engine of high drive friction may be employed.

We have discovered that it is essential for both wheels to be driven in order to obtain rough country performance. The motor 18 has a driving connection to both wheels 16. While various mechanism can be used, we prefer at present to employ a continuous chain 23 for this purpose. The gear box 17 has a driving sprocket 24, about which the chain 23 is draped, and idler sprockets 26 maintain the chain in contact with a substantial portion of the periphery of this drive sprocket 24. Driven sprockets 27 are secured to each wheel 16 and the chain 23 engages these sprockets to drive both wheels 16.

The litter frame 11 may be formed of any suitable structural members and we prefer at present to make it of airplane tubing, either steel or aluminum. The bed of the litter should be disposed fairly close to the ground to lower the center of gravity. Horizontal rail members 11a may be spaced apart by cross bars 11b, and canvas 11c (FIG. 3) or other suitable material may be stretched between the rails 11a to complete the litter bed. Manual handling of the litter is facilitated if the handles are disposed above the bed, and a pair of handles 11d may be disposed at each end of the litter 11. These handles are above the plane of the litter bed.

The pivotal connection 12 between the litter bed and the motor unit 10 is provided particularly in accordance with the invention. A pair of U-shaped or V-shaped members 12a may have their upper ends secured to the litter frame 11, and their lower ends may be pivoted to the motor unit frame 14 by pivot bolt. The litter frame 11 accordingly can pivot on the motor unit 10 (and vice versa) until the handles 11d touch the ground.

The shock absorber 13 has one end connected to the motor unit 10, as by a suitable bracket 29, and the other end is suitably connected to the litter frame 11, as to a cross bar 11b.

A throttle control (FIG. 1) may be in the form of a Bowden wire 31 operated by a spring biased hand lever 32.

The operation of the device of FIGS. 1 to 3 is as follows. The entire device is maintained in an upright position by leaning against an object or supporting it on a wheel stand (not shown). The motor is started by operating a pull cord or other suitable starter. The motor is then idling and there is no motion to the motorized litter. The operator then grasps the right hand handle pair 11d, and stands the device independently upright. Next the throttle is operated by lever 32 and the increased engine speed causes centrifugal clutch 19 to engage, driving the pulley 21 and belt 22 to drive the gear box 17 and drive sprocket 24. This in turn drives endless chain 23 which drives both wheels 16, causing the entire device to move to the left in FIGS. 1 through 3.

The maximum speed of the entire device is preferably a fast walk, and when the litter is carrying a load uphill it will, of course, slow down. If an obstacle is encountered such as a rock larger in diameter than the wheels 16, the right wheel 16 drives the left wheel 16 hard against the rock, and as the left wheel rotates, it will climb the rock because of the traction afforded by this pressing action of the other wheel. The device can thus climb vertical obstacles of limited height and the operator can keep the litter bed generally horizontal by pivoting it on the motor unit 10 as the motor unit inclines while climbing the terrain.

The shock absorber 13 permits the operator to control the attitude or angle of disposition of the motor unit for a short period of time. For example, if the litter is traveling over large rocks and the forward wheel starts down the far side of a large rock, the operator can press down on the right hand handle pair 11d to lift the forward wheel in space to place it on the next rock. Thus the motor unit can be made to bridge deep recesses where it would be inadvisable or impossible for the motor unit to travel the profile of the recess. Contrary-wise, the rear wheel can be held in space by lifting on the right hand handles 11d when the forward wheel is on a solid object. The shock absorber limits the speed of pivoting, thus giving pivoting control.

The entire litter can travel steep sided recesses of greater width than the wheel base of the wheels 16 (the distance between wheel axles), by employing two operators, one forward and one rear. The two operators bodily lift the device across such recesses. The forward operator can reach the far wall of recess by sitting or standing on the forward end of the litter while the rear operator controls it as a cantilever bridge. Once the wheels have gained the far side of the recess, the rear operator can be carried across in a similar fashion. The entire motor unit is preferably kept light, on the order of 50 to 60 pounds, so that the weight of the device, plus the load will not exceed the capabilities of the two operators to bodily lift it.

In traversing down hill terrain with a load, the worm drive, cross shaft, gear box 17 prevents forward motion unless driven by the motor. In this fashion brakes are avoided and the operator is not forced to pull back on the device, but instead merely operates it at a low motor speed.

The shock absorber or dashpot 13 is also useful in causing the device to turn. The operator merely presses or lifts, causing one wheel or the other to momentarily leave the ground and he can then pivot the device horizontally on the wheel in contact with the ground.

Figure 4:
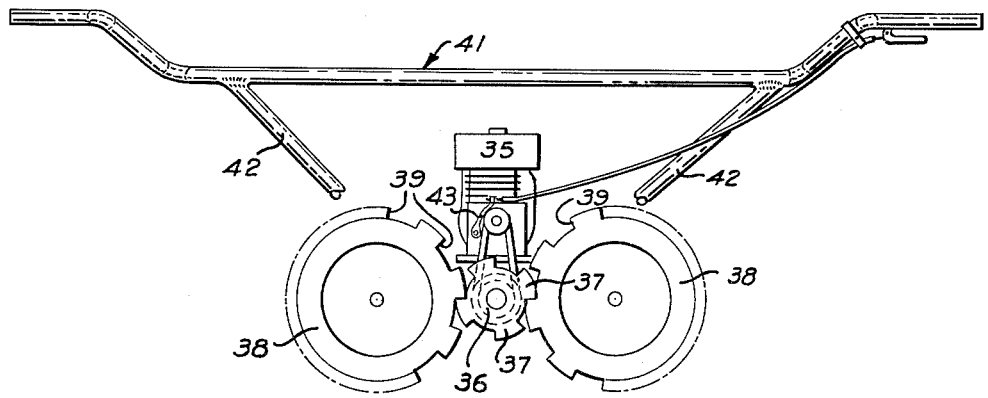
FIG. 4 is an elevation view of a modified form of the invention with portions broken away to discuss the direct drive of the motor on the wheels.

Illustrated in FIG. 4 is a modification of the invention wherein the motor drives the wheels by direct contact with the periphery of the wheels. The truck or motor unit includes a motor 35 driving (preferably through reduction gearing) a rotor 36 having lugs 37 on its periphery. A pair of wheels 38 are so spaced on a truck frame that their periphery is engaged by the rotor 36. The wheels 38 have notches 39 on the tire surface which notches receive the lugs 37 of the rotor 36, thus providing a positive, gear-like, drive between the motor and the wheels. Driving rotors and inflatable tires having mating lugs and notches are commercially available, but we do not believe that two in-line wheels have heretofore been driven by a single rotor.

The remainder of the apparatus of FIG. 4 is similar to that of FIGS. 1 to 3 and includes a litter 41 connected by V-shaped members 42 to the motor or truck unit by means of a pivot connection (not shown).

The operation of the device of FIG. 4 differs from FIGS. 1 to 3 in that a brake 43 is used to control down hill travel. The brake assists engine compression to slow the entire motorized litter. A shock absorber or other dashpot may be provided if so desired.

Figure 5:
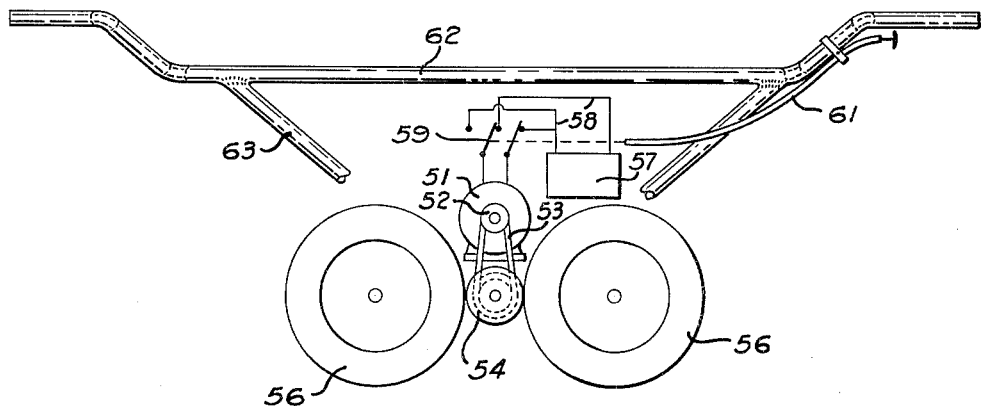
FIG. 5 is a schematic view of a second modification wherein an electric motor acts also as a generator when braking action is desired.

Illustrated in FIG. 5 is an electric truck unit on which the litter is mounted. The truck or motor unit includes an electric motor 51 driving a pulley 52 and belt 53 which in turn rotates a friction contact wheel 54. A pair of supporting wheels 56 are so spaced as to both engage the friction wheel 54 with considerable pressure. Rotation of friction wheel 54 accordingly drives the in-line truck wheels 56. Both the friction wheel 54 and the truck wheels 56 may be relatively smooth if desired.

The electric motor may receive its current from a battery 57 connected to the motor by a pair of conductors 58. A reversing switch 59 is interposed between the motor and battery and is suitably controlled as by a Bowden wire 61. This reversing switch is used to convert the motor 51 into a generator when the loaded device is traveling downhill. The generator, acting against the load of the battery resistance, effectively brakes the downhill travel. Conversion to a generator is effected by throwing the switch 59. If desired, a shunt resistor could also be installed to increase the generator load as needed.

A litter frame 62 may be pivotally connected to the electric truck unit of FIG. 5 in any suitable manner, as by V members 63.

From the foregoing description it will be apparent that we have provided a mechanical "mule" that can be operated by a single person over very rough terrain. The design has proved itself in carrying out deer bodies in extremely mountainous and broken country. The in-line wheel arrangement permits maximum traction in climbing obstacles, and chains may be placed on the wheels, with advantage, to increase traction. Hard metal chains bite into hard ground and the softer rocks; also deep tire treads known as snow treads aid traction in rough country. The in-line wheel arrangement gives a narrow motor or truck unit that can travel between rocks and other low obstructions. While the shock absorber or dashpot is not strictly necessary, it aids greatly in one-man operation both for bridging recesses and for turning.

Various modifications will be apparent to those skilled in the art, and we claim all such modifications and variations as fall within the true spirit and scope of our invention.

We claim:

1. A motor driven litter comprising: a wheel frame including a pair of parallel frame members; a pair of wheels mounted in line between the frame members; a motor mounted on the wheel frame; a driving connection between the motor and the wheels; an elongated litter frame disposed above the wheel frame; supports extending downwardly from each side of the litter frame to the motor frame; means for pivoting the litter supports to each frame member of the motor frame along a horizontal transverse axis and disposing the direction of elongation with the line of the wheel pair, and means to limit the rate of angular movement between said wheel frame and said litter frame about said pivot, said pivot and said means being the only connections between said wheel frame and said litter frame whereby said litter frame may be readily maintained in horizontal position regardless of the inclination of the wheel frame in ascending or descending hills.

2. A motor driven litter as set forth in claim 1 wherein the motor is an electric motor energized from a battery and the motor is reversible to act as a generator when the litter proceeds downhill under load.

3. A motor driven litter comprising; a wheel frame; a pair of wheels mounted fixedly in line on the wheel frame; a motor mounted on the wheel frame; a driving connection between the motor and the wheels; an elongated litter frame; a pivot connection between the litter frame and the wheel frame disposing the in-line wheels under the litter frame in the line of its elongation and having a horizontal transverse pivot axis, whereby said motor frame may pivot with respect to the litter frame while traversing uneven ground, and a regulated dashpot mechanism connected to the litter frame and to the wheel frame at a point away from the pivot axis, to control the rate of angular movement of the litter frame relative to the wheel frame.

References Cited in the file of this patent

UNITED STATES PATENTS

| | | |
|---|---|---|
| 656,491 | Valentine | Aug. 21, 1900 |
| 1,198,098 | Bergh | Sept. 12, 1916 |
| 1,830,400 | Midboe | Nov. 3, 1931 |
| 2,313,591 | Slaughter | Mar. 9, 1943 |
| 2,491,824 | McKee | Dec. 20, 1949 |
| 2,567,423 | Cleghorn | Sept. 11, 1951 |
| 2,656,894 | Giovannoni | Oct. 27, 1953 |
| 2,754,131 | Tulin | July 10, 1956 |
| 2,761,690 | Bradley | Sept. 4, 1956 |
| 2,855,061 | Lilienthal et al. | Oct. 7, 1958 |
| 2,869,661 | Fernandez | Jan. 20, 1959 |

OTHER REFERENCES

Pamphlet: Equipment Development Report No. 45, March 1957, "Powered Duffle Carriers," Forest Service, U.S. Dept. of Agriculture, pages 6, 7 and 8.